(12) United States Patent
Mitsugi

(10) Patent No.: US 11,318,508 B2
(45) Date of Patent: May 3, 2022

(54) GLASS-PLATE CLEANING DEVICE AND METHOD FOR PRODUCING GLASS PLATE

(71) Applicant: Nippon Electric Glass Co., Ltd., Shiga (JP)

(72) Inventor: Kaoru Mitsugi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 162 days.

(21) Appl. No.: 16/652,810

(22) PCT Filed: Sep. 12, 2018

(86) PCT No.: PCT/JP2018/033748
§ 371 (c)(1),
(2) Date: Apr. 1, 2020

(87) PCT Pub. No.: WO2019/069646
PCT Pub. Date: Apr. 11, 2019

(65) Prior Publication Data
US 2020/0230670 A1     Jul. 23, 2020

(30) Foreign Application Priority Data
Oct. 2, 2017   (JP) .............................. JP2017-192864

(51) Int. Cl.
*B08B 11/04*    (2006.01)
*B08B 1/02*     (2006.01)
*B08B 3/04*     (2006.01)

(52) U.S. Cl.
CPC ................ *B08B 11/04* (2013.01); *B08B 1/02* (2013.01); *B08B 3/041* (2013.01)

(58) Field of Classification Search
CPC .. B08B 11/04; B08B 1/02; B08B 3/04; B08B 3/041; B08B 1/04; B08B 7/04; C03C 23/00
See application file for complete search history.

(56) References Cited

U.S. PATENT DOCUMENTS

| | | | |
|---|---|---|---|
| 5,025,523 A * | 6/1991 | Zappa ................. | A47L 11/4061 15/98 |
| 5,651,160 A * | 7/1997 | Yonemizu ......... | H01L 21/30625 15/302 |
| 2015/0068867 A1 * | 3/2015 | Nishimura ........ | H01L 21/67784 198/373 |

FOREIGN PATENT DOCUMENTS

| | | |
|---|---|---|
| CN | 201077908 | 6/2008 |
| JP | 4-131470 | 12/1992 |

(Continued)

OTHER PUBLICATIONS

International Search Report dated Dec. 18, 2018 in International (PCT) Application No. PCT/JP2018/033748.

(Continued)

*Primary Examiner* — Douglas Lee
(74) *Attorney, Agent, or Firm* — Wenderoth, Lind & Ponack, L.L.P.

(57) ABSTRACT

A cleaning apparatus for a glass sheet includes a housing in which a cleaning liquid is stored, a plurality of spindle cases fixed to the housing to face an internal space of the housing, a spindle rotatably held in each of the spindle cases to face an internal space of the each of the spindle cases, and a cleaning member mounted to a distal end portion of the spindle. The cleaning apparatus also includes a first supply path formed in the each of the spindle cases to supply the cleaning liquid in the internal space of the housing to the internal space of the each of the spindle cases, and a second supply path formed in the spindle to supply the cleaning liquid in the internal space of the each of the spindle cases to the cleaning member.

16 Claims, 5 Drawing Sheets

(56) References Cited

FOREIGN PATENT DOCUMENTS

| | | | |
|---|---|---|---|
| JP | 10-189513 | | 7/1998 |
| JP | 10189513 A | * | 7/1998 |
| JP | 2004-33570 | | 2/2004 |
| JP | 2006-167529 | | 6/2006 |
| JP | 2006167529 A | * | 6/2006 |
| JP | 2012-213746 | | 11/2012 |
| JP | 2017-14060 | | 1/2017 |

OTHER PUBLICATIONS

International Preliminary Report on Patentability and Written Opinion of the International Searching Authority dated Dec. 18, 2018 in International (PCT) Application No. PCT/JP2018/033748.
Office Action dated Aug. 24, 2021 in corresponding Chinese Patent Application No. 201880062079.7, with English-language translation.

* cited by examiner

GLASS-PLATE CLEANING DEVICE AND METHOD FOR PRODUCING GLASS PLATE

TECHNICAL FIELD

The present invention relates to a cleaning apparatus for a glass sheet and a manufacturing method for a glass sheet including a cleaning step.

BACKGROUND ART

An increase in resolution of flat panel displays (FPDs) such as liquid crystal displays, plasma displays, and organic EL displays has been promoted. With the increase in resolution, a dense electric circuit is formed on a glass sheet used as a substrate for the FPD in a manufacturing process of the FPD. Thus, high cleanliness without dust and dirt is required for the glass sheet of this type.

Therefore, in the manufacturing process of the glass sheet, a cleaning step of cleaning the glass sheet is generally provided, for example, after a cutting step of cutting an original glass sheet into a predetermined size to obtain a plurality of glass sheets G.

As a method of cleaning a glass sheet, there is given, for example, as disclosed in Patent Literature 1, a method of cleaning a glass sheet by bringing cleaning members each including a cleaning portion formed of, for example, a sponge into contact with main surfaces of the glass sheet while rotating the cleaning members. In Patent Literature 1, cleaning is performed in a state in which both the main surfaces of the glass sheet are nipped with a pair of cleaning members.

CITATION LIST

Patent Literature 1: JP 2017-14060 A

SUMMARY OF INVENTION

Technical Problem

In the disclosure of Patent Literature 1, a cleaning liquid is supplied to the glass sheet with a shower nozzle. However, when the cleaning liquid is supplied in this way, the cleaning liquid is not efficiently supplied to contact portions between the cleaning members and the glass sheet, and is liable to be wasted. Therefore, it is preferred that the cleaning liquid be directly supplied to the cleaning members from the viewpoint of reducing the waste of the cleaning liquid.

However, when, in order to directly supply the cleaning liquid to the cleaning members, an attempt is made to connect an independent pipe to each of the cleaning members from a tank arranged at a position away from the cleaning members so as to supply the cleaning liquid stored in the tank, the number of pipes increases by the number of cleaning members, and the pipe structure becomes complicated. As a result, there is a problem in that it requires a labor of piping.

It is an object of the present invention to reduce, as much as possible, a labor of piping for supplying a cleaning liquid while reducing waste of the cleaning liquid.

Solution to Problem

According to one embodiment of the present invention, which has been devised to achieve the above-mentioned object, there is provided a cleaning apparatus for a glass sheet, which is configured to clean at least one of a pair of main surfaces of the glass sheet which are opposed to each other in a sheet thickness direction of the glass sheet, the cleaning apparatus comprising: a housing in which a cleaning liquid is stored in an internal space of the housing; a plurality of spindle cases fixed to the housing so as to face the internal space of the housing; a spindle rotatably held in each of the spindle cases so as to face an internal space of the each of the spindle cases; a cleaning member, which is mounted to a distal end portion of the spindle outside the housing and the each of the spindle cases, and is configured to clean the at least one of the main surfaces of the glass sheet while being held in contact with the at least one of the main surfaces of the glass sheet; a first supply path formed in the each of the spindle cases so as to supply the cleaning liquid in the internal space of the housing to the internal space of the each of the spindle cases; and a second supply path formed in the spindle so as to supply the cleaning liquid in the internal space of the each of the spindle cases to the cleaning member. According to such a configuration, the cleaning liquid in the internal space of the housing is first supplied to the internal space of each spindle case through the first supply path of each spindle case. After that, the cleaning liquid supplied to the internal space of each spindle case is supplied to each cleaning member through the second supply path of each spindle. Therefore, the cleaning liquid stored in the internal space of the housing is directly supplied to each cleaning member through the first supply path and the second supply path, and hence no complicated piping is required. Further, the cleaning liquid is directly supplied to each cleaning member, and hence waste of the cleaning liquid is reduced.

In the above-mentioned configuration, it is preferred that the each of the spindle cases rotatably hold the spindle through intermediation of a sliding bearing made of resin. Lubricating oil or grease is used in a rolling bearing made of metal. However, in the case of the sliding bearing made of resin, the rotation performance of the spindle can be maintained without use of lubricating oil or grease. Therefore, it is possible to prevent lubricating oil or grease from seeping out to contaminate the glass sheet. Further, in the case of the sliding bearing made of resin, even when the sliding bearing is abraded, abrasion powder generated by the abrasion is derived from the resin and hence is relatively soft. Therefore, there is also an advantage in that, even when abrasion powder adheres to the glass sheet, the glass sheet is less liable to be damaged.

In the above-mentioned configuration, it is preferred that a layer of the cleaning liquid be formed between a bearing surface of the sliding bearing and an outer peripheral surface of the spindle. With this configuration, the layer of the cleaning liquid plays a role like a lubricant so that abrasion of the sliding bearing and the spindle can be reduced.

In the above-mentioned configuration, it is preferred that the housing be inclined in accordance with inclination of the main surfaces of the glass sheet, and that the second supply path formed in the spindle located at a lower position due to the inclination of the housing have a portion having a cross-sectional area smaller than the second supply path formed in the spindle located at a higher position due to the inclination of the housing. With this configuration, the cleaning liquid is less likely to come out of the second supply path formed in the spindle located at the lower position at which the pressure of the cleaning liquid is relatively high, and the cleaning liquid is likely to come out of the second supply path formed in the spindle located at the higher position at which the pressure of the cleaning liquid is relatively low. Therefore, even when a pressure difference occurs in the cleaning liquid due to the height difference, the amount of the cleaning liquid supplied from the second supply path of each spindle to each cleaning member can be set to be substantially uniform to reduce cleaning unevenness.

In the above-mentioned configuration, it is preferred that the spindle comprise a spacer configured to adjust a reference position of the cleaning member with respect to the glass sheet at a distal end portion of the spindle. With this configuration, the reference position of the cleaning member can be adjusted by changing the thickness of the spacer. Thus, even when the thickness of the glass sheet or the thickness of the cleaning member changes, the abutment state of the cleaning member with respect to the glass sheet can be kept constant.

In the above-mentioned configuration, it is preferred that the housing have a third supply path for pumping the cleaning liquid to the internal space of the housing. With this configuration, the pressure of the cleaning liquid in the internal space of the housing is increased by the cleaning liquid pumped through the third supply path. Thus, the cleaning liquid can be smoothly supplied through the first supply path in the spindle case and the second supply path in the spindle. Further, the cleaning liquid is sequentially supplied to the internal space of the housing through the third supply path, and hence the cleaning liquid does not disappear from the internal space of the housing during cleaning even when the volume of the housing is reduced. Therefore, it is possible to reduce the size of the housing to save the space of the entire cleaning apparatus.

In the above-mentioned configuration, it is preferred that a rotational driving force be applied to a base end portion of the spindle on a side opposite to the distal end portion of the spindle outside the housing and the each of the spindle cases. With this configuration, the rotational driving force is applied to the spindle outside the housing and the each of the spindle cases. Thus, the cleaning liquid in the internal space of the housing is prevented from being brought into direct contact with a rotation drive mechanism, and hence contamination of the cleaning liquid can be prevented. Further, the base end portion of the spindle to which the rotational driving force is applied is located on the side opposite to the distal end portion located on the glass sheet side. Thus, there is also an advantage in that dust generated from the rotation drive mechanism is less liable to adhere to the glass sheet.

According to one embodiment of the present invention, which has been devised to achieve the above-mentioned object, there is provided a manufacturing method for a glass sheet, comprising a cleaning step of cleaning at least one of a pair of main surfaces of a glass sheet which are opposed to each other in a sheet thickness direction of the glass sheet, wherein a cleaning apparatus comprises: a housing in which a cleaning liquid is stored in an internal space of the housing; a plurality of spindle cases fixed to the housing so as to face the internal space of the housing; a spindle rotatably held in each of the spindle cases so as to face an internal space of the each of the spindle cases; and a cleaning member, which is mounted to a distal end portion of the spindle outside the housing and the each of the spindle cases, and is configured to clean the at least one of the main surfaces of the glass sheet while being held in contact with the at least one of the main surfaces of the glass sheet, and wherein, in the cleaning step, the cleaning liquid in the internal space of the housing is supplied to the internal space of the each of the spindle cases, and then, the cleaning liquid in the internal space of the each of the spindle cases is supplied to the cleaning member through the spindle. With such a configuration, the same actions and effects as those of the corresponding configuration described above can be attained.

In the above-mentioned configuration, it is preferred that the cleaning liquid be supplied to the internal space of the housing by pumping the cleaning liquid.

Advantageous Effects of Invention

According to the present invention, it is possible to reduce, as much as possible, a labor of piping for supplying the cleaning liquid while reducing waste of the cleaning liquid.

DESCRIPTION OF EMBODIMENTS

Figure 1:
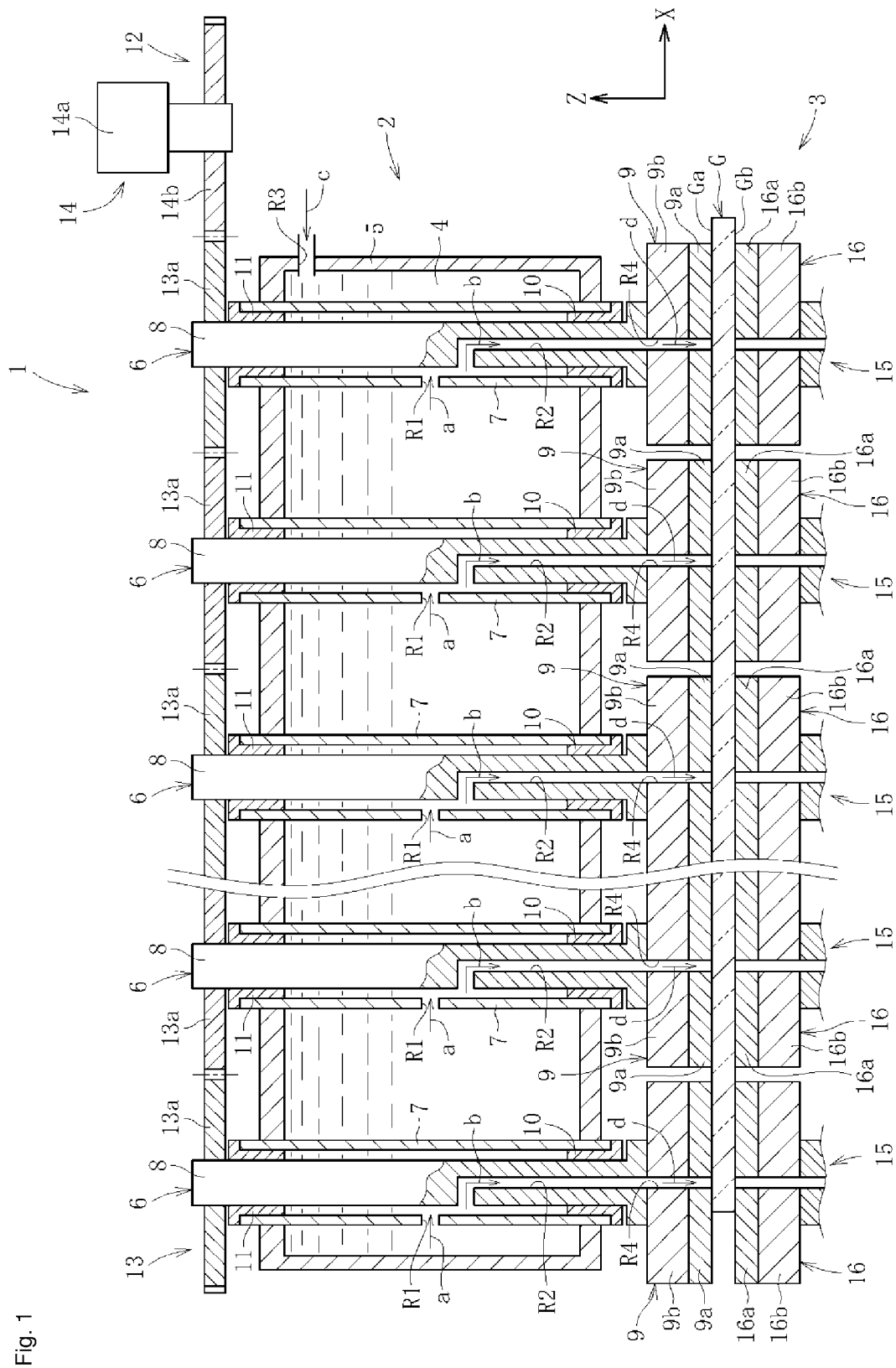
FIG. 1 is a sectional view for illustrating a cleaning apparatus for a glass sheet according to a first embodiment.

Now, a cleaning apparatus for a glass sheet and a manufacturing method for a glass sheet according to this embodiment are described with reference to the drawings. The items X, Y, and Z in the drawings form an orthogonal coordinate system. The X direction and the Y direction are horizontal directions, and the Z direction is a vertical direction. The XZ plane including the X direction and the Z direction is a plane orthogonal to a conveying direction of the glass sheet.

First Embodiment

As illustrated in FIG. 1, a cleaning apparatus 1 for a glass sheet according to a first embodiment is configured to simultaneously clean a pair of main surfaces Ga and Gb of a glass sheet G which are opposed to each other in a sheet thickness direction while conveying the glass sheet G in a horizontal posture by a conveying mechanism (not shown) such as a roller conveyor or a belt conveyor.

The cleaning apparatus 1 comprises a first cleaning mechanism 2 and a second cleaning mechanism 3. The first cleaning mechanism 2 is configured to clean the main surface Ga on an upper side of the glass sheet G. The second cleaning mechanism 3 is configured to clean the main surface Gb on a lower side of the glass sheet G. The configuration of the first cleaning mechanism 2 and the configuration of the second cleaning mechanism 3 are substantially the same. Therefore, the configuration of the first cleaning mechanism 2 is mainly described below, and the detailed description of the configuration of the second cleaning mechanism 3 is omitted.

The first cleaning mechanism 2 comprises a housing 5 and a plurality of cleaning units 6. In the housing 5, a cleaning liquid 4 is stored in an internal space. The plurality of cleaning units 6 are configured to clean the main surface Ga of the glass sheet G. As the cleaning liquid 4, for example, water can be used. Alternatively, as the cleaning liquid 4, water to which a detergent or the like is added may be used.

Figure 2:
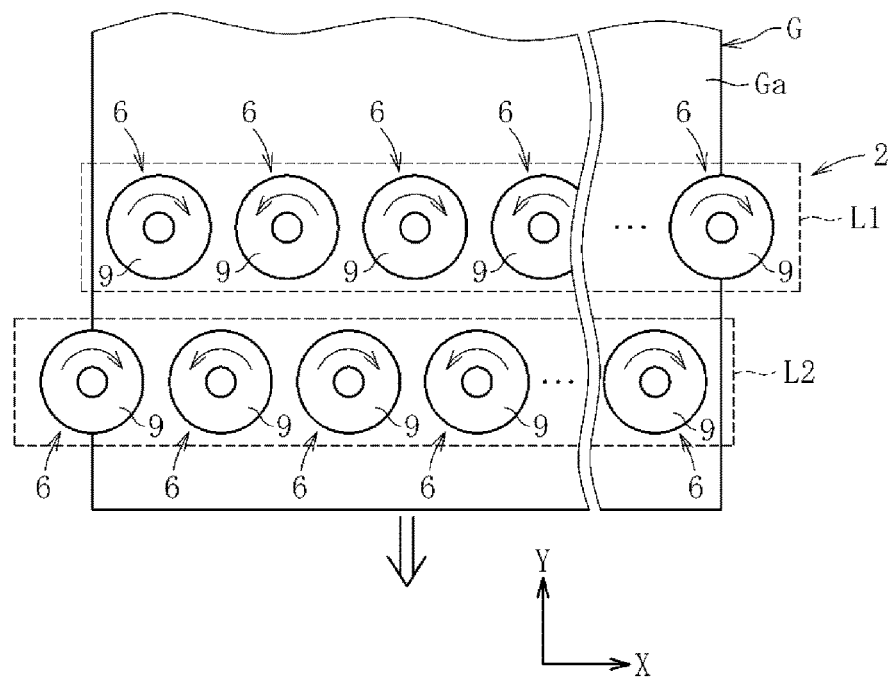
FIG. 2 is a plan view for illustrating the cleaning apparatus for a glass sheet in FIG. 1.

The plurality of cleaning units 6 are arranged in line along a width direction of the glass sheet G (X direction) orthogonal to the conveying direction of the glass sheet G (Y direction in FIG. 2). Each cleaning unit 6 comprises a spindle case 7, a spindle 8, and a cleaning member 9. The spindle case 7 is fixed to the housing 5 so as to face an internal space of the housing 5. The spindle 8 is rotatably held in the spindle case 7 so as to face an internal space of the spindle case 7. The cleaning member 9 is mounted to a distal end portion of the spindle 8 outside the housing 5 and the spindle case 7. Here, "distal end portions" of the spindle case 7 and the spindle 8 refer to end portions on the glass sheet G side, and "base end portions" thereof refer to end portions on a side opposite to the distal end portions on the glass sheet G side.

A cylindrical sliding bearing (bushing) 10 is press-fitted and fixed to a distal end portion of the spindle case 7, and a cylindrical sliding bearing (bushing) 11 is press-fitted and fixed to the base end portion of the spindle case 7. An outer peripheral surface of the spindle 8 is rotatably held by bearing surfaces (inner peripheral surfaces) of the sliding bearings 10 and 11. The sliding bearings 10 and 11 may be made of, for example, metal, but are made of resin (for example, made of engineering plastic) in this embodiment.

The cleaning member 9 is removable from the spindle 8. The cleaning member 9 comprises a cleaning portion 9a and a supporting portion 9b. The cleaning portion 9a is configured to clean the main surface Ga of the glass sheet G while being held in contact with the main surface Ga of the glass sheet G. The cleaning portion 9a is mounted to the supporting portion 9b. The cleaning portion 9a is configured to press the main surface Ga of the glass sheet G with a constant pressure during cleaning. The type of the cleaning portion 9a may be, for example, a brush, but is a sponge in this embodiment. The shape of the cleaning portion 9a is not particularly limited, but is a disk shape in this embodiment.

The spindle case 7 has a first supply path R1 that allows communication between the internal space of the housing 5 and the internal space of the spindle case 7, and the cleaning liquid 4 in the internal space of the housing 5 is supplied to the internal space of the spindle case 7 through the first supply path R1 as indicated by the arrow "a".

The spindle case 8 has a second supply path R2 that allows communication between the internal space of the spindle case 7 and the cleaning member 9, and the cleaning liquid 4 in the internal space of the spindle case 7 is supplied to the cleaning member 9 through the second supply path R2 as indicated by the arrow "b".

The housing 5 has a third supply path R3 for supplying the cleaning liquid 4 to the internal space of the housing 5 from the outside, and the cleaning liquid 4 stored in a tank (not shown) arranged outside the housing 5 is pumped to the internal space of the housing 5 through the third supply path R3 by a pump or the like (not shown) as indicated by the arrow "c". Through the pumping of the cleaning liquid 4, the pressure of the cleaning liquid 4 supplied to the internal space of the housing 5 is maintained at a high state. In this embodiment, only one third supply path R3 is formed in the housing 5, but a plurality of third supply paths R3 may be formed.

The cleaning member 9 has a through hole R4 that communicates with the second supply path R2, and the cleaning liquid 4 supplied through the second supply path R2 is supplied to the glass sheet G through the through hole R4 as indicated by the arrow "d". The through hole R4 may be omitted when the cleaning member 9 is formed of a material that can transmit the cleaning liquid (for example, porous body or the like).

With the configuration described above, the supply paths R1 to R3 and the through hole R4 allow the cleaning liquid 4 to be supplied via the internal space of the housing 5, the internal space of the spindle case 7, the cleaning member 9, and the glass sheet G in the stated order. Therefore, the cleaning liquid 4 supplied to the internal space of the housing 5 is directly supplied to each cleaning member 9 through the first supply path R1 and the second supply path R2. Thus, no complicated piping for supplying a cleaning liquid is required, and further, waste of the cleaning liquid 4 is reduced.

In addition, the most parts of the spindle case 7 and the spindle 8 are in a state of being immersed in the cleaning liquid 4 stored in the internal space of the housing 5. Thus, an effect that the spindle case 7 and the spindle 8 are cooled by the cleaning liquid 4 can be expected. Therefore, it is conceivable that, also while the spindle 8 is rotated to clean the glass sheet G, thermal expansion of the spindle case 7 and the spindle 8 is reduced, and a rotating operation of the spindle can be maintained favorably.

In this embodiment, the first supply path R1 is located at a lower position with respect to an opening of the third supply path R3 on the housing 5 side, and the second supply path R2 is located at a lower position with respect to the first supply path R1. The height relationship of those supply path R1, R2, and R3 is not particularly limited, and can be adjusted as appropriate.

The first cleaning mechanism 2 comprises a rotation drive mechanism 12 configured to rotationally drive the spindle 8 of each cleaning unit 6. The rotation drive mechanism 12 is configured to apply a rotational driving force to a base end portion of the spindle 8 outside the housing 5 and the spindle case 7.

Specifically, the rotation drive mechanism 12 comprises a gear mechanism 13 and a drive unit 14. The gear mechanism 13 comprises a plurality of gears 13a each mounted to the base end portion of each spindle 8, and the gears 13a adjacent to each other in the X direction mesh with each other. The drive unit 14 comprises a motor 14a and a gear 14b mounted to the motor 14a, and the gear 14b meshes with the gear 13a on one end side of the gear mechanism 13 in the X direction. Therefore, when the gear 14b is rotated through rotation of the motor 14a, the power is transmitted to the gear mechanism 13 to rotate the spindle 8 of each cleaning unit 6.

The gears 13a and 14b may be made of, for example, metal (for example, SUS), but are made of resin (for example, made of engineering plastic) in this embodiment. As the gears 13a and 14b, a member made of metal and a member made of resin may be used in combination.

The gears 13a adjacent to each other in the X direction directly mesh with each other. Therefore, the spindles 8 adjacent to each other in the X direction rotate in directions opposite to each other (see FIG. 2), but may be configured to rotate in the same direction, for example, by increasing gears. Further, a power transmission unit is not limited to the gear mechanism 13, and may be, for example, other means such as a belt. In addition, drive units may be individually mounted to the spindles 8.

Here, in FIG. 1, the reference symbols 15 denote cleaning units, the reference symbols 16 denote cleaning members, the reference symbols 16a denote cleaning portions, and the reference symbols 16b denote supporting portions, and those are configurations related to the second cleaning mechanism 3. The cleaning apparatus 1 is configured to clean the main surfaces Ga and Gb of the glass sheet G while nipping the glass sheet G with the pair of cleaning members 9 and 16.

As illustrated in FIG. 2, the first cleaning mechanism 2 comprises a plurality of (two in the illustrated example) of cleaning unit lines L1 and L2 arranged apart from each other in the Y direction, and each of the cleaning unit lines L1 and L2 comprises the plurality of cleaning units 6 arranged in line in the X direction. The cleaning members 9 in the cleaning unit line L1 on an upstream side and the cleaning members 9 in the cleaning unit line L2 on a downstream side are offset in the X direction. As a result, when viewed in the Y direction, the cleaning member 9 in the cleaning unit line L2 on the downstream side is arranged so as to overlap a gap between the cleaning members 9 adjacent to each other in the X direction in the cleaning unit line L1 on the upstream side. With this, the cleaning members 9 are held in contact with the glass sheet G over the entire width of the glass sheet G, thereby being capable of preventing cleaning unevenness of the glass sheet G.

Figure 3:
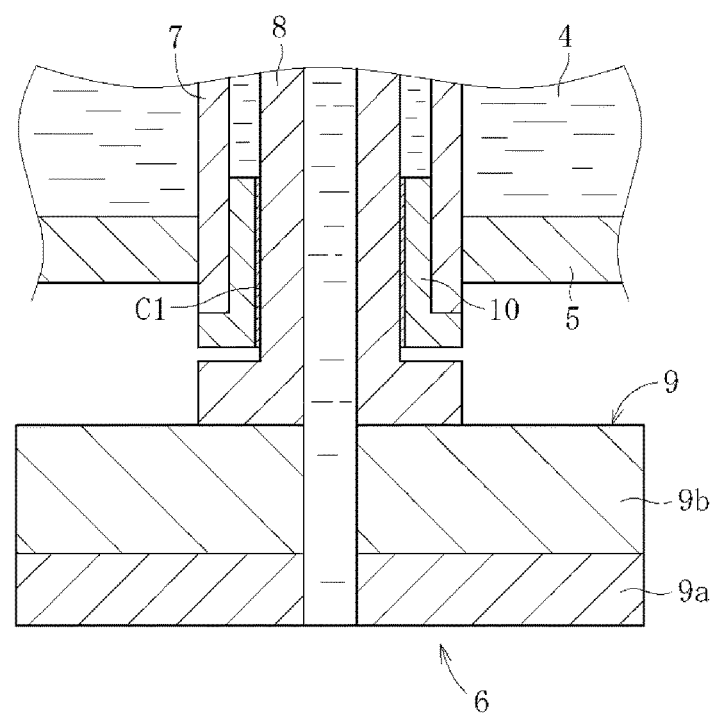
FIG. 3 is an enlarged sectional view for illustrating a distal end portion side of a spindle case in the cleaning apparatus for a glass sheet in FIG. 1.
Figure 4:
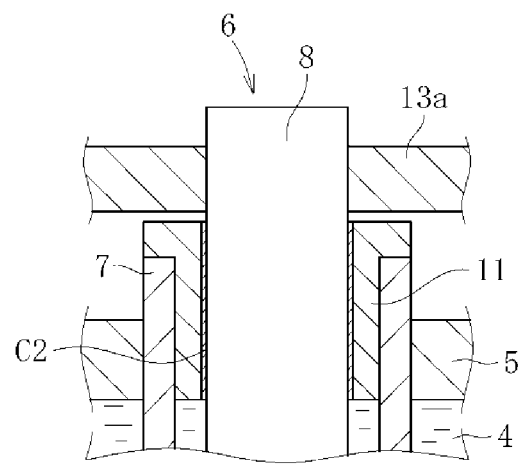
FIG. 4 is an enlarged sectional view for illustrating a base end portion side of the spindle case in the cleaning apparatus for a glass sheet in FIG. 1.

As illustrated in FIG. 3 and FIG. 4, liquid layers C1 and C2 are formed between a bearing surface of the sliding bearing 10 and an outer peripheral surface of the distal end portion of the spindle 8 and between a bearing surface of the sliding bearing 11 and an outer peripheral surface of the base end portion of the spindle 8, respectively. The liquid layers C1 and C2 are formed in such a manner that the cleaning liquid 4 supplied to the internal space of the spindle case 7 seeps out from portions corresponding to the liquid layers C1 and C2. Therefore, the liquid layers C1 and C2 each have a lubricating function derived from the cleaning liquid 4. Therefore, abrasion of the sliding bearings 10 and 11 or the spindle 8 can be prevented.

The cleaning liquid 4 forming the liquid layers C1 and C2 becomes likely to seep out by increasing the pressure of the cleaning liquid 4 in the internal space of the housing 5. The pressure of the cleaning liquid 4 in the internal space of the housing 5 can be adjusted, for example, by changing the amount of supply of the cleaning liquid 4 to the internal space of the housing 5 per unit time. The cleaning liquid 4 forming the liquid layers C1 and C2 is gradually replaced with a new cleaning liquid along with seeping out.

Next, the manufacturing method for a glass sheet according to this embodiment is described. This manufacturing method comprises a cleaning step using the above-mentioned cleaning apparatus 1 for a glass sheet.

Specifically, the manufacturing method for a glass sheet comprises, for example, a forming step, an annealing step, a sheet collecting step, a cutting step, the cleaning step, an inspection step, and a packing step. A heat treatment step may be provided after the sheet collecting step. Further, an end-surface processing step may be provided after the cutting step.

In the forming step, a glass ribbon is formed from molten glass by a publicly-known method such as an overflow down-draw method or a float method.

In the annealing step, in order to reduce warpage and internal strain of the glass ribbon thus formed, the glass ribbon thus formed is annealed.

In the sheet collecting step, the glass ribbon thus annealed is cut at each predetermined length to obtain a plurality of original glass sheets.

In the heat treatment step, heat treatment is performed on the original glass sheet in, for example, a heat treatment furnace.

In the cutting step, the original glass sheet is cut into a predetermined size to obtain one or a plurality of glass sheets G. As the cutting method for the original glass sheet, there can be used, for example, bending stress cleaving of propagating a scribe line formed along a preset cutting line by bending stress, laser cleaving of propagating an initial crack formed in a part of the preset cutting line along the preset cutting line by thermal stress generated due to laser irradiation and rapid cooling, and laser fusing of cutting the original glass sheet along the preset cutting line while melting the original glass sheet by laser irradiation. It is preferred that the glass sheet G have a rectangular shape. The size of one side of the glass sheet G is preferably 1,000 mm to 3,000 mm, and the sheet thickness of the glass sheet G is preferably 0.05 mm to 10 mm, more preferably 0.2 mm to 0.7 mm.

In the end-surface processing step, end-surface processing comprising grinding, polishing, and corner cut of an end surface is performed on the glass sheet G.

In the cleaning step, the glass sheet G is cleaned while being conveyed in a horizontal posture using the cleaning apparatus 1 described above.

In the inspection step, inspection is performed on the glass sheet G thus cleaned whether or not there is a flaw, dust, or dirt on the surface and/or there is an internal defect such as air bubbles or foreign matters. The inspection is performed using an optical inspection device such as a camera.

In the packing step, the glass sheets G which are found to satisfy a desired quality as a result of the inspection are packed. The packing is performed by stacking the plurality of glass sheets G on a predetermined pallet in a horizontal posture or a vertical posture. In this case, it is preferred that a slip sheet or a protective sheet formed of foamed resin or the like be interposed between the glass sheets G in a stacking direction.

Second Embodiment

Figure 5:
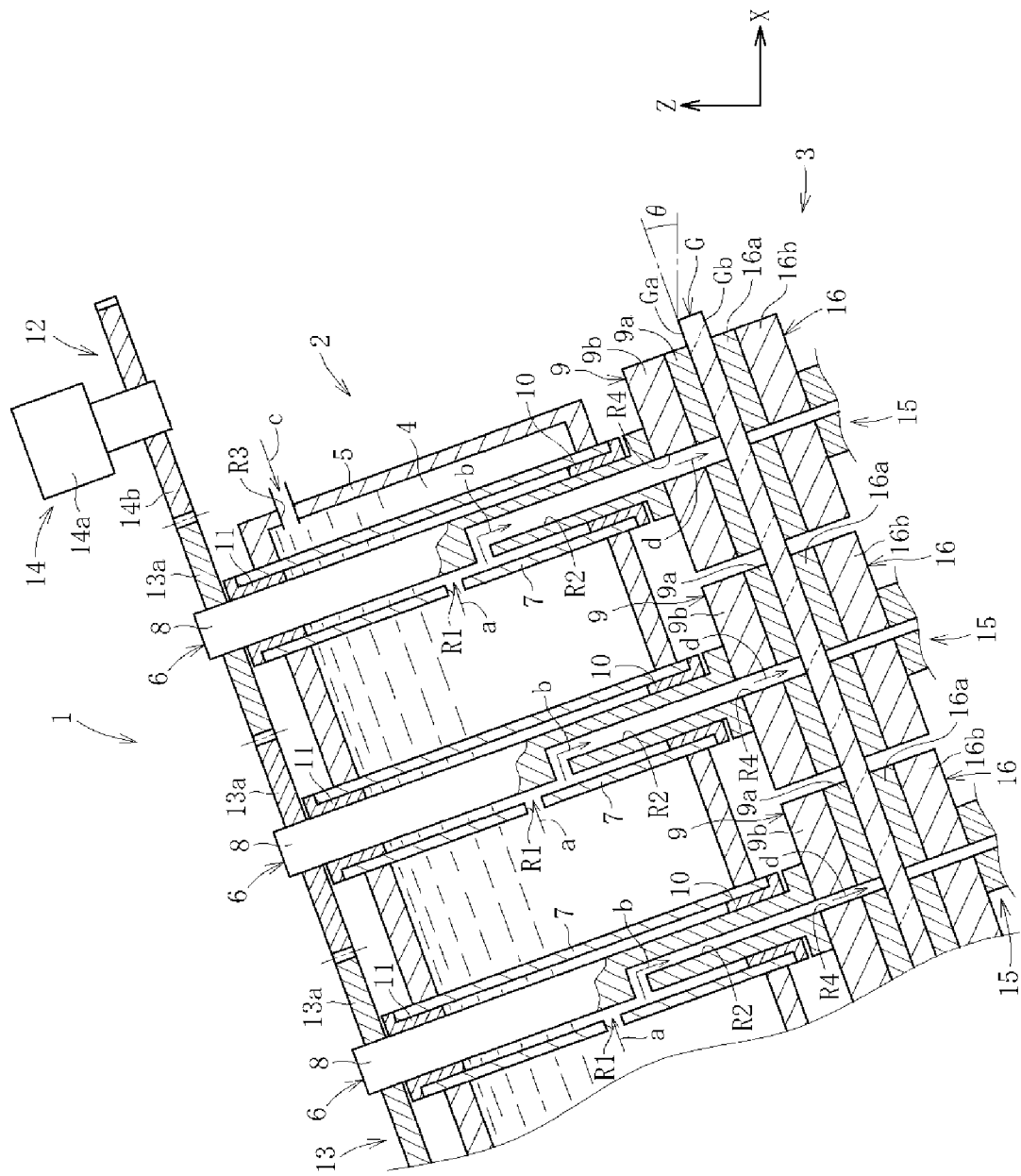
FIG. 5 is a sectional view for illustrating a cleaning apparatus for a glass sheet according to a second embodiment.

As illustrated in FIG. 5, a cleaning apparatus 1 for a glass sheet and a manufacturing method for a glass sheet according to a second embodiment are different from the cleaning apparatus 1 for a glass sheet and the manufacturing method for a glass sheet according to the first embodiment in that the glass sheet G is cleaned while being conveyed in an inclined posture. In the following, differences from the first embodiment are mainly described. Configurations common to the first embodiment are denoted by the same reference symbols for description.

In the cleaning apparatus 1 for a glass sheet according to the second embodiment, in the first cleaning mechanism 2, the housing 5 is inclined in accordance with inclination of the main surface Ga of the glass sheet G. Due to the inclination of the housing 5, the cleaning units 6 provided in the housing 5 have height differences. It is preferred that an inclination angle θ of the main surface Ga of the glass sheet G with respect to a horizontal plane be, for example, 2° to 10°.

The second supply path R2 formed in the spindle 8 located at a lower position has a portion having a cross-sectional area smaller than the second supply path R2 formed in the spindle 8 located at a higher position. In this embodiment, each second supply path R2 has a substantially constant cross-sectional area from an opening end on the spindle case 7 side to an opening end on the cleaning member 9 side, and the cross-sectional area of the second supply path R2 formed in the spindle 8 located at the lower position is smaller than the cross-sectional area of the second supply path R2 formed in the spindle 8 located at the higher position. That is, the cross-sectional areas of the three second supply paths R2 in FIG. 5 gradually decrease from the higher position (right side in FIG. 5) toward the lower position (left side in FIG. 5). With such a configuration, even when a pressure difference occurs in the cleaning liquid 4 in the internal space of the housing 5 due to the height difference caused by the inclination of the housing 5, the amount of the cleaning liquid 4 supplied from the second supply path R2 of each spindle 8 to each cleaning member 9 can be set to be substantially uniform to reduce cleaning unevenness.

It is preferred that, when the second supply paths R2 each have a circular cross section, the diameters of the second supply paths R2 be changed by 1 mm to 9 mm.

In FIG. 5, the cross-sectional areas of the through holes R4 of the three cleaning members 9 also gradually decrease from the higher position toward the lower position, but the cross-sectional areas of the through holes R4 may be the same.

An orifice may be formed in a part of the second supply path R2 formed in the spindle 8 located at the lower position as a portion having a cross-sectional area smaller than the second supply path R2 formed in the spindle 8 located at the higher position. That is, the second supply path R2 formed in the spindle 8 located at the lower position may have a portion having a cross-sectional area smaller than the second supply path R2 formed in the spindle 8 located at the higher position at only a part thereof.

In order to set uniform the amount of the cleaning liquid 4 supplied to each cleaning member 9, the first supply path R1 formed in the spindle case 7 located at the lower position may have a portion having a cross-sectional area smaller than the first supply path R1 formed in the spindle case 7 located at the higher position. For the same purpose, the through hole R4 formed in the supporting portion 9b (or the cleaning portion 9a and the supporting portion 9b) of the cleaning member 9 located at the lower position may have a portion having a cross-sectional area smaller than the through hole R4 formed in the supporting portion 9b (or the cleaning portion 9a and the supporting portion 9b) of the cleaning member 9 located at the higher position. In addition, in the second cleaning mechanism 3, the cross-sectional areas of the second supply paths and the through holes are the same in FIG. 5, but may be different from each other.

Third Embodiment

Figure 6:
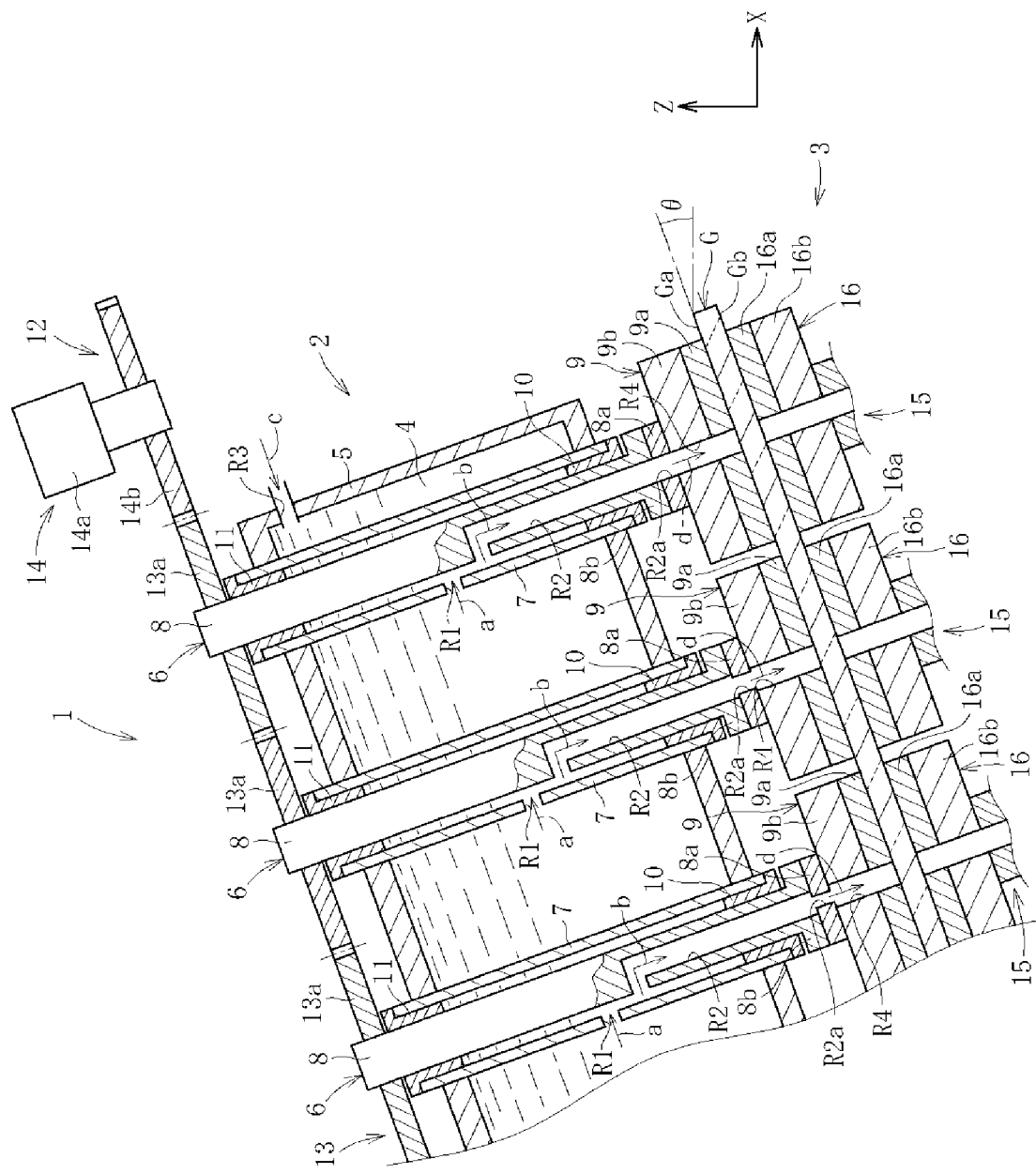
FIG. 6 is a sectional view for illustrating a cleaning apparatus for a glass sheet according to a third embodiment.

As illustrated in FIG. 6, a cleaning apparatus 1 for a glass sheet and a manufacturing method for a glass sheet according to a third embodiment are different from the cleaning apparatus 1 for a glass sheet and the manufacturing method for a glass sheet according to the first and second embodiments in that, in the first cleaning mechanism 2, the spindle 8 comprises a spacer 8a configured to adjust the height (reference position with respect to the glass sheet G) of the cleaning member 9 at a distal end portion thereof. In the following, differences from the first and second embodiments are mainly described. Configurations common to the first and second embodiments are denoted by the same reference symbols for description.

In the third embodiment, description is made of a case in which the housing 5 is inclined as in the second embodiment. As a matter of course, the housing 5 may be horizontal as in the first embodiment.

In the cleaning apparatus 1 for a glass sheet according to the third embodiment, the spacer 8a is removably mounted to a flange portion 8b formed at the distal end portion of the spindle 8. The cleaning member 9 is removably mounted to the flange portion 8b of the spindle 8 through intermediation of the spacer 8a. With this, the height of the cleaning member 9 is adjusted in accordance with the thickness of the spacer 8a. That is, for example, when the glass sheet G is thin, the cleaning member 9 is brought closer to the glass sheet G side using the spacer 8a which is relatively thick, and when the glass sheet G is thick, the cleaning member 9 is separated away from the glass sheet G side using the spacer 8a which is relatively thin. With this, the abutment state of the cleaning member 9 and the glass sheet G can be kept constant regardless of the thickness of the glass sheet G. Alternatively, when the cleaning member 9 is thin, the cleaning member 9 is brought closer to the glass sheet G side using the spacer 8a which is relatively thick, and when the cleaning member 9 is thick, the cleaning member 9 is separated away from the glass sheet G side using the spacer 8a which is relatively thin. With this, the abutment state of the cleaning member 9 and the glass sheet G can be kept constant regardless of the thickness of the cleaning member 9.

In this embodiment, the spacer 8a has a through hole R2a forming an opening end portion on the cleaning member 9 side of the second supply path R2 of the spindle 8. In other words, the through hole R2a of the spacer 8a forms a part of the second supply path R2.

In this embodiment, a portion excluding the through hole R2a of the spacer 8a in the second supply path R2 of the spindle 8 located at the lower position has the same cross-sectional area as a portion excluding the through hole R2a of the spacer 8a in the second supply path R2 formed in the spindle 8 located at the higher position. Meanwhile, the cross-sectional area of the through hole R2a of the spacer 8a in the second supply path R2 of the spindle 8 located at the lower position is smaller than the cross-sectional area of the through hole R2a of the spacer 8a in the second supply path R2 formed in the spindle 8 located at the higher position. That is, in FIG. 6, the cross-sectional areas of the through holes R2a of the three spacers 8a gradually decrease from the higher position (right side in FIG. 6) toward the lower position (left side in FIG. 6). Therefore, the through hole R2a of the spacer 8a functions as an orifice for setting the amount of the cleaning liquid 4 supplied from the second supply path R2 of each spindle 8 to each cleaning member 9 to be substantially uniform.

Incidentally, in the second cleaning mechanism 3, a spacer (not shown) is provided similarly so that the height of the cleaning member 16 (reference position with respect to the glass sheet G) can be adjusted. In this case, the spacer 8a in the first cleaning mechanism 2 may be omitted or used in combination.

Further, in this embodiment, the height of the cleaning member 9 is adjusted by changing the thickness of the spacer 8a. However, the height of the cleaning member 9 may be adjusted by changing the height of the spindle 8. This change of the height of the spindle 8 can be achieved by, for example, the spindle case 7 holding the spindle 8 in a state in which the height of the spindle 8 can be changed. Even when the height of the cleaning member 9 is adjusted by changing the height of the spindle 8 the spacer 8a may be used as an orifice for setting the amount of the cleaning liquid 4 supplied to each cleaning member 9 to be substantially uniform.

The present invention is not limited to the configurations of the above-mentioned embodiments. In addition, the action and effect of the present invention are not limited to those described above. The present invention may be modified in various forms within the range not departing from the spirit of the present invention.

In the embodiments described above, description is made of the case in which the glass sheet is moved relative to the cleaning members arranged at fixed positions. However, either one may be moved as long as there is relative movement between the cleaning members and the glass sheet. That is, the cleaning members may be moved relative to the glass sheet arranged at a fixed position, or both the glass sheet and the cleaning members may be moved.

In the embodiments described above, the third supply path for supplying the cleaning liquid to the housing may be omitted. In other words, there may be employed a configuration in which the cleaning liquid is not supplied to the internal space of the housing from the outside during cleaning by, for example, increasing the volume of the internal space of the housing. In this case, in order to increase the pressure of the cleaning liquid in the internal space of the housing, gas (for example, air) may be supplied to the internal space of the housing from the outside, or a variable mechanism for the volume of the internal space of the housing may be provided.

In the embodiments described above, at least one cleaning member of the pair of cleaning members opposed to each other in the sheet thickness direction of the glass sheet may be movable between a reference position and a retracted position in the sheet thickness direction of the glass sheet. That is, a sensor or the like may detect that the glass sheet is conveyed to a predetermined position. Based on the detection result, at least one cleaning member of the pair of cleaning members opposed to each other in the sheet thickness direction of the glass sheet may be moved from the retracted position to the reference position in the sheet thickness direction of the glass sheet to narrow the interval between the pair of cleaning members so that the pair of cleaning members are brought into abutment against the main surfaces of the glass sheet.

In the embodiments described above, the first cleaning mechanism and the second cleaning mechanism may have different configurations. For example, when the cleaning liquid is supplied on the main surface side on the upper side of the glass sheet, the cleaning liquid supplied to the main surface on the upper side is supplied also to the main surface on the lower side of the glass sheet along the surface of the glass sheet. Therefore, the second cleaning mechanism may not have a configuration in which the cleaning member directly supplies the cleaning liquid to the glass sheet (for example, the housing, the first to third supply paths, or the through holes of the cleaning members).

In the embodiments described above, one of the main surfaces of the glass sheet may be cleaned.

REFERENCE SIGNS LIST 1 cleaning apparatus
2 first cleaning mechanism
3 second cleaning mechanism
4 cleaning liquid
5 housing
6 cleaning unit
7 spindle case
8 spindle
8a spacer
9 cleaning member
9a cleaning portion
9b supporting portion
10 bearing
11 bearing
12 rotation drive mechanism
13 gear mechanism
14 drive unit
C1, C2 liquid layer
G glass sheet
Ga, Gb main surface
R1 first supply path
R2 second supply path
R2a through hole (for spacer)
R3 third supply path
R4 through hole (for cleaning member)

The invention claimed is:

1. A cleaning apparatus for a glass sheet, which is configured to clean at least one of a pair of main surfaces of the glass sheet which are opposed to each other in a sheet thickness direction of the glass sheet, the cleaning apparatus comprising:
   a housing in which a cleaning liquid is stored in an internal space of the housing;
   a plurality of spindle cases fixed to the housing so as to face the internal space of the housing;
   a spindle rotatably held in each of the spindle cases, each of the spindles facing an internal space of an associated one of the spindle cases;
   a cleaning member, which is mounted to a distal end portion of each of the spindles outside of the housing and each of the spindle cases, and is configured to clean the at least one of the main surfaces of the glass sheet while being held in contact with the at least one of the main surfaces of the glass sheet;
   a first supply path formed in each of the spindle cases, each of the first supply paths supplying the cleaning liquid in the internal space of the housing to the internal space of an associated one of the spindle cases; and
   a second supply path formed in each of the spindles, each of the second supply paths supplying the cleaning liquid in the internal space of an associated one of the spindle cases to an associated one of the cleaning members.

2. The cleaning apparatus for a glass sheet according to claim 1, wherein each of the spindle cases rotatably holds an associated one of the spindles through intermediation of a sliding bearing made of resin.

3. The cleaning apparatus for a glass sheet according to claim 2, wherein a layer of the cleaning liquid is formed between a bearing surface of each of the sliding bearings and an outer peripheral surface of an associated one of the spindles.

4. The cleaning apparatus for a glass sheet according to claim 3,
   wherein the housing is inclined in accordance with inclination of the main surfaces of the glass sheet, and
   the second supply path associated with one of the spindles located at a highest position due to the inclination of the housing has a portion with a cross-sectional area that is larger than a cross-sectional area of a portion of the second supply path associated with another of the spindles located at a position that is lower than the highest position.

5. The cleaning apparatus for a glass sheet according to claim 4, wherein each of the spindles comprises a spacer configured to adjust a reference position of an associated one the cleaning members with respect to the glass sheet at the distal end portion of the spindle.

6. The cleaning apparatus for a glass sheet according to claim 3, wherein each of the spindles comprises a spacer configured to adjust a reference position of an associated one the cleaning members with respect to the glass sheet at the distal end portion of the spindle.

7. The cleaning apparatus for a glass sheet according to claim 2,
wherein the housing is inclined in accordance with inclination of the main surfaces of the glass sheet, and
wherein the second supply path associated with one of the spindles located at a highest position due to the inclination of the housing has a portion with a cross-sectional area that is larger than a cross-sectional area of a portion of the second supply path associated with another of the spindles located at a position that is lower than the highest position.

8. The cleaning apparatus for a glass sheet according to claim 7, wherein each of the spindles comprises a spacer configured to adjust a reference position of an associated one the cleaning members with respect to the glass sheet at the distal end portion of the spindle.

9. The cleaning apparatus for a glass sheet according to claim 2, wherein each of the spindles comprises a spacer configured to adjust a reference position of an associated one the cleaning members with respect to the glass sheet at the distal end portion of the spindle.

10. The cleaning apparatus for a glass sheet according to claim 1,
wherein the housing is inclined in accordance with inclination of the main surfaces of the glass sheet, and
wherein the second supply path associated with one of the spindles located at a highest position due to the inclination of the housing has a portion with a cross-sectional area that is larger than a cross-sectional area of a portion of the second supply path associated with another of the spindles located at a position that is lower than the highest position.

11. The cleaning apparatus for a glass sheet according to claim 10, wherein each of the spindles comprises a spacer configured to adjust a reference position of an associated one the cleaning members with respect to the glass sheet at the distal end portion of the spindle.

12. The cleaning apparatus for a glass sheet according to claim 1, wherein each of the spindles comprises a spacer configured to adjust a reference position of an associated one of the cleaning members with respect to the glass sheet at the distal end portion of the spindle.

13. The cleaning apparatus for a glass sheet according to claim 1, wherein the housing has a third supply path for pumping the cleaning liquid to the internal space of the housing.

14. The cleaning apparatus for a glass sheet according to claim 1, wherein a base end portion of each of the spindles on a side opposite to the distal end portion is configured to receive a rotational driving force.

15. A manufacturing method for a glass sheet, the manufacturing method comprising a cleaning step of cleaning at least one of a pair of main surfaces of a glass sheet which are opposed to each other in a sheet thickness direction of the glass sheet with a cleaning apparatus,
wherein the cleaning apparatus comprises:
a housing in which a cleaning liquid is stored in an internal space of the housing;
a plurality of spindle cases fixed to the housing so as to face the internal space of the housing;
a spindle rotatably held in each of the spindle cases, each of the spindles facing an internal space of an associated one of the spindle cases; and
a cleaning member, which is mounted to a distal end portion of each of the spindles outside of the housing and each of the spindle cases, and is configured to clean the at least one of the main surfaces of the glass sheet while being held in contact with the at least one of the main surfaces of the glass sheet, and
wherein, in the cleaning step, the cleaning liquid in the internal space of the housing is supplied to the internal space of each of the spindle cases, and then, the cleaning liquid in the internal space of each of the spindle cases is supplied to an associated one of the cleaning members through an associated one of the spindles.

16. The manufacturing method for a glass sheet according to claim 15, wherein the cleaning liquid is supplied to the internal space of the housing by pumping the cleaning liquid.

* * * * *